United States Patent [19]

Ogawa et al.

[11] 4,398,680
[45] Aug. 16, 1983

[54] WEBBING LOCKING DEVICE

[75] Inventors: Hisashi Ogawa, Okazaki; Hiroshi Tsuge, Chiryu, both of Japan

[73] Assignees: Kabushiki Kaisha Tokai-Rika-Denki-Seisakusho, Toyota; Toyota Jidosha Kogyo Kabushiki Kaisha, Aichi, both of Japan

[21] Appl. No.: 237,989

[22] Filed: Feb. 25, 1981

[30] Foreign Application Priority Data

Mar. 3, 1980 [JP] Japan ............................ 55-27251[U]

[51] Int. Cl.³ .................... B65H 75/48; A62B 35/02
[52] U.S. Cl. ............................... 242/107.2; 280/806; 297/480
[58] Field of Search ....... 242/107.2, 107.4 R–107.4 E; 280/801, 803, 806–808; 297/468–480

[56] References Cited

U.S. PATENT DOCUMENTS 3,817,473 6/1974 Board et al. ..................... 242/107.2
4,128,261 12/1978 Paitula ........................... 280/806 X
4,249,708 2/1981 Asano ............................. 242/107.2

Primary Examiner—Stuart S. Levy
Attorney, Agent, or Firm—Parkhurst & Oliff

[57] ABSTRACT

A section of a webbing between a takeup shaft and an occupant fastened portion thereof is guided around a roller pivotally supported on a rotatable plate, and the rotatable plate adapted to be rotated by an increased tension of the webbing is caused to approach a lock bar to clamp the webbing between the roller and the lock bar, whereby the movement of the webbing in the longitudinal direction thereof is prevented, so that an occupant can be restrained. The roller is prevented from rotating by lock means when the occupant is restrained, whereby the webbing is decreased in tension at the portion of the roller, so that an abrupt change in tension at the clamped portion of the webbing between the roller and the lock bar can be prevented, thereby enabling to avoid breakage of the webbing.

6 Claims, 12 Drawing Figures

WEBBING LOCKING DEVICE

BACKGROUND OF THE INVENTION

1. Field of the Invention

The present invention relates to webbing locking devices used in seatbelt systems for locking an occupant restraining webbing when necessary, and more particularly to a webbing locking device adapted to directly lock the intermediate portion of the webbing.

2. Description of the Prior Art

In general, seatbelt systems are used to restrain an occupant with an occupant restraining webbing for protecting him in an emergency such as a collision of a vehicle. There has been proposed a webbing locking device in which such consideration is given that the intermediate portion of the webbing is directly clamped during a vehicular emergency whereby the webbing is prevented from extending and the webbing loosely wound into the retractor is prevented from being tightened, so that the occupant can remain in a perfectly restrained condition.

In the webbing locking device of the type described, a rotatable plate is pivotally supportd on a frame, the webbing is guided around the forward end portion of the rotatable plate to transmit a tensional force of the webbing in an emergency of the vehicle as a pivotally moving force of the rotatable plate, whereby this pivotally moving force is utilized to directly clamp the intermediate portion of the webbing by clamping means, so that the webbing can be prevented from moving in the longitudinal direction thereof.

A roller is provided at a webbing contact portion of this rotatable plate for the purpose of decreasing a resistance against the movement of the webbing. However, tensional forces of the webbing in front and at the back of the webbing contact portion of the roller are substantially equal to each other when the windout of the webbing is stopped, whereby no decrease of tension in the webbing occurs at the webbing contact portion of the roller, thus presenting such disadvantages that the webbing cannot be positively clamped at the clamped portion thereof or the webbing may be broken at the clamped portion thereof.

SUMMARY OF THE INVENTION

The present invention has been developed to obviate the abovedescribed disadvantages and has as its object the provision of a webbing locking device in which, during normal running condition of the vehicle, a resisting force against the movement of the webbing in the longitudinal direction thereof is very small, and, during an emergency, a resisting force is applied to the movement of the webbing, so that a change in tension generated in the webbing clamped by the clamping means can be relieved.

The webbing locking device according to the present invention is of such an arrangement that, when the tension generated in the webbing is increased to turn the rotatable plate, a roller pivotally supported on the rotatable plate and having the intermediate portion of an occupant restraining webbing guided therearound is prevented from turning by locking means, whereby the tension of the webbing guided around is decreased, so that a change in tension generated in the webbing clamped portion by clamping means can be relieved.

Description will hereunder be given of embodiments of the present invention with reference to the drawings.

DESCRIPTION OF THE PREFERRED EMBODIMENT

Figure 1:
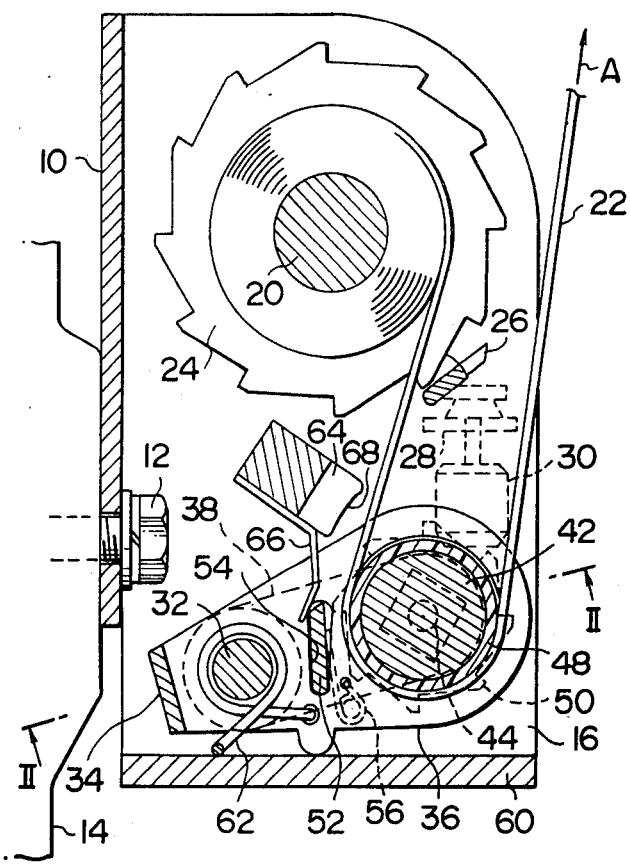
FIG. 1 is a sectional view showing an embodiment of the webbing lock device according to the present invention.

As shown in FIG. 1, in the webbing locking device according to the present invention, a frame 10 is solidly secured to a vehicle body 14 through a mounting bolt 12. A pair of legs 16 being in parallel to each other are erected from opposite ends of this frame 10 (In FIG. 1, only one of the legs 16 is shown and the other is omitted). An end portion of an occupant restraining webbing 22 is wound in layers onto a takeup shaft 20 racked across the legs 16. Here, the takeup shaft 20 is biased in the windup direction of the webbing 22 by a biasing force of a spiral spring, not shown, confined between the takeup shaft 20 and the frame 10.

Solidly secured to this takeup shaft 20 are a pair of ratchet wheels 24 which are opposed to a pawl 26 pivotally supported on the legs 16. This pawl 26 is rested on a pendulum 30 suspended from one of the legs 16 through a bracket 28. Consequently, when the pendulum 30 senses an acceleration of a vehicle and is thereby pivotally moved, the pawl 26 is pushed up by the pendulum 30 and tilted, whereby the pawl 26 engages with the ratchet wheels 24, so that the takeup shaft 20 can be stopped in its webbing windout rotation. In addition, when the pendulum 30 holds its axis in the vertical direction, the pawl 26 is separated by gravity from the ratchet wheels 24.

Figure 2:
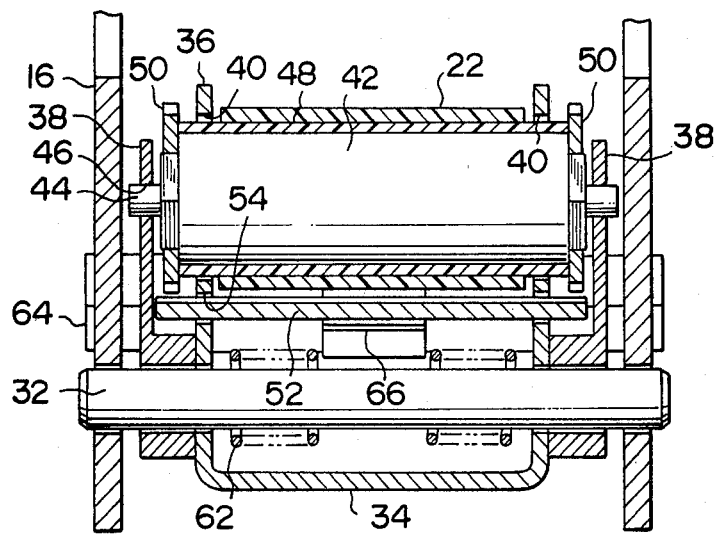
FIG. 2 is a sectional view taken along the line II—II in FIG. 1.

Pivot 32 is racked across the legs 16, and a rotatable plate 34 is pivotally supported on this pivot 32. More specifically, as shown in FIG. 2, this rotatable plate 34 has a letter 'U' shape in a planar position, and pivot 32 penetrates through legs 36 erected from opposite ends of the rotatable plate 34. Holders 38 are fixed to the outer surfaces of the legs 36, respectively, disposed between the legs 16 of the frame 10 and the legs 36, and made rotatable along with the rotatable plate 34.

The rotatable plate 34 is penetratingly provided in the legs 36 thereof with round holes 40, respectively, into which a roller 42 is inserted with a circumferential gap being formed between the round holes and itself. This roller 42 is formed at axially opposite end portions thereof with small diameter portions 44, which are inserted through bearing holes 46 of the holders 38, whereby the roller 42 is pivotally supported by the holders 38. A coating 48 of a synthetic resin material such as rigid urethane is applied to the outer peripheral portion of this roller 42. A webbing 22 wound out of the takeup shaft 20 in a tangential direction is guided around the outer periphery of this resin coating 48 and turned back toward the occupant fastened portion (a direction indicated by an arrow A). Consequently, the webbing 22 wound out of the takeup shaft 20 is turned back at the roller 42 as shown in FIG. 1, to thereby represent substantially a letter 'U' shape.

Small ratchet wheels 50 are solidly secured to portions of the roller 42 adjacent the opposite ends thereof, and opposed to a small pawl 52 pivotally supported on the legs 36 of the rotatable plate 34. This small pawl 52 is inserted into windows 54 formed in the legs 36 to thereby be pivotally supported on the legs 36, and is separated from the ratchet wheels 50 by a biasing force of a torsional coil springs 56 confined between the legs 36 and itself. If this small pawl 52 is engaged with the small ratchet wheels 50, then the small ratchet wheels 50 are prevented from turning in the counterclockwise direction in FIG. 1, so that a resisting force is given against the movement of the webbing 22 in the longitudinal direction thereof toward the occupant fastened portion.

Figure 3:
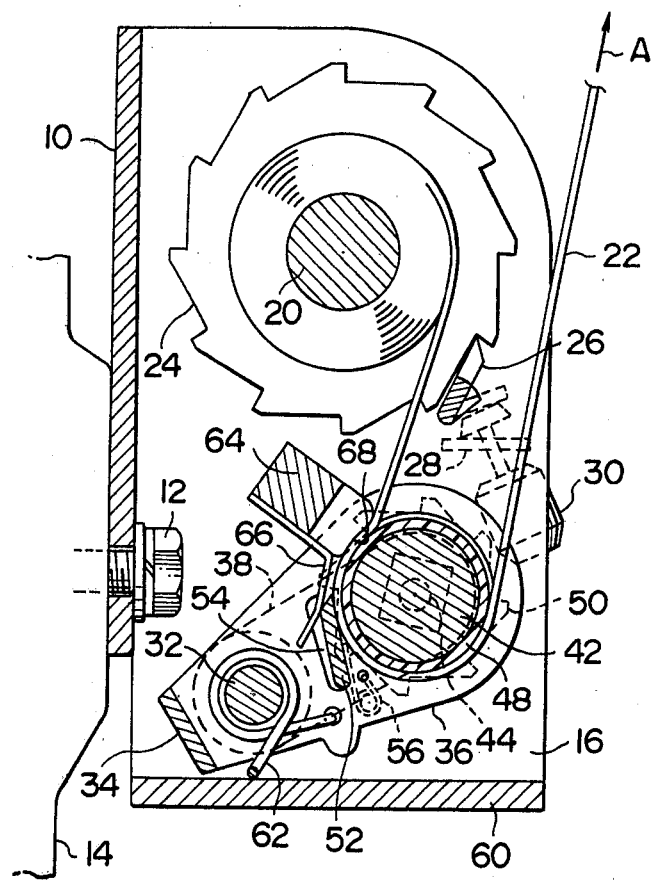
FIG. 3 is a sectional view showing the operating condition of FIG. 1.

The rotatable plate 34 is biased in a direction of approaching a bottom 60 of the frame by a biasing force of torsional coil springs 62, which are confined between the rotatable plate 34 and the bottom 60 of the frame and through the intermediate portions of which the pivot 32 is extended. When the tension of the webbing 22 guided around the roller 42 exceeds a predetermined value, the rotatable plate 34 is turned in the counterclockwise direction in FIG. 1, against the biasing forces of the torsional coil springs 62. When this rotatable plate 34 is turned, the roller 42 is adapted to approach a lock bar 64 racked across the legs 16, whereby, as shown in FIG. 3, the roller 42 and the lock bar 64 clamp the intermediate portion of the webbing 22, thereby preventing the webbing 22 from moving in the longitudinal direction thereof. In other words, the roller 42 and the lock bar 64 constitute the clamping means.

Furthermore, when this rotatable plate 34 is turned, the forward end portion of a working arm 66 formed of a sheet spring or the like secured to the lock bar 64 comes into abutting contact with the back of the small pawl 52, whereby the small pawl 52 comes into engagement with the ratchet wheels 50 aginst the biasing force of the torsional coil spring 56.

Figure 4:
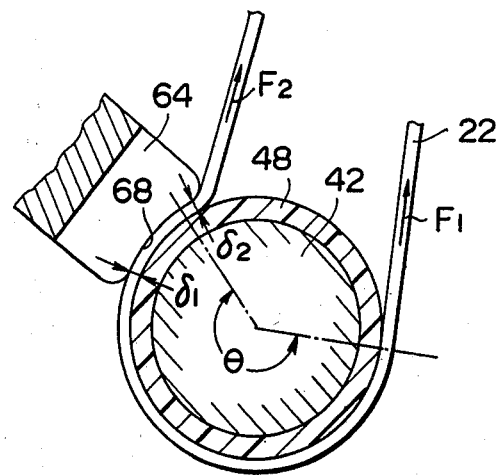
FIG. 4 is a partially enlarged view of FIG. 3.

In addition, the outer surface of the lock bar 64 facing the roller 42 is formed into a plane of curvature corresponding to the outer periphery of the roller 42, and, when the rotatable plate 34 is turned and the roller 42 and the lock bar 64 clamp the webbing 22, the interval formed between the roller 42 and the lock bar 64 is changed such that the webbing 22 thus clamped is progressively decreased in its thickness toward the takeup shaft 20 as shown in FIG. 4. More specifically, as shown in FIG. 4, the thickness of the webbing 22 is progressively decreased from the maximum interval $\delta_1$ to the minimum interval $\delta_2$. With this arrangement, the pressdown value generated in the clamped portion of the webbing is progressively increased toward the takeup shaft 20, thereby preventing an abrupt change generated in the webbing.

Description will now be given of action of the abovedescribed embodiment.

The occupant can wind out the webbing 22 from the takeup shaft 20 to fasten same to himself, and, during normal running condition of the vehicle, the webbing 22 is not prevented from being wound up or out, so that the occupant can freely wind up or out the webbing to change his driving posture. In this case, the roller 42, around which the intermediate portion of the webbing 22 is guided, has a slight circumferential gap between the legs 36 and itself, so that the roller 42 can avoid a turning resistance from the legs 36. Furthermore, this roller 42 has a frictional resistance between the bearing holes 46 of the holders 38 and itself, however, due to the difference in diameter between the webbing contact portion and the small diameter portion 44, the resisting force against the movement of the webbing 22 in the longitudinal direction thereof is very small in value.

Next, during a vehicular emergency such as a collision, the pendulum 30 senses an acceleration of the vehicle thereby moving pivotally and pushes up the pawl 26 as shown in FIG. 3. As the result, the pawl 26 is tilted to be engaged with the ratchet wheels 24, to thereby stop the webbing windout rotation of the takeup shaft 20. Simultaneously with this, the webbing 22 is increased in tension due to an inertial force generated in the occupant, and this tension is transmitted to the rotatable plate 34 through the roller 42.

Figure 5:
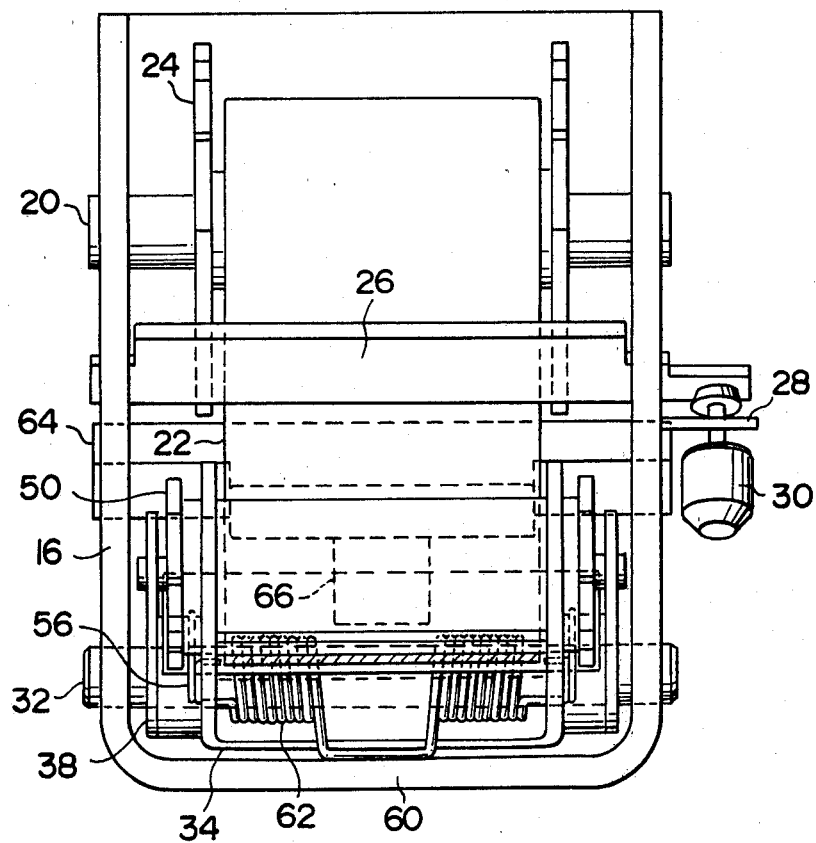
FIG. 5 is a side view of FIG. 3.

As a consequence, the rotatable plate 34 is turned about the pivot 32 in the counterclockwise direction against the biasing force of the torsional coil springs 62 as shown in FIGS. 3 through 5 and approaches the lock bar 64. By this, the roller 42 clamps the webbing 22 between the lock bar 64 and itself through the resin coating 48, whereby the intermediate portion of the webbing 22 is strongly pressed, so that the movement of the webbing 22 can be prevented from moving in the longitudinal direction thereof.

Since the intermediate portion of the webbing 22 is direcly clamped, no high tension acts on the section of the webbing between the clamped portion and the takeup shaft 20, and in this section of the webbing, the webbing does not extend and the webbing wound onto the takeup shaft 20 in layers is not tightened again, even if the webbing is loosely wound up. With this arrangement, the occupant can be positively restrained by this clampedly locked portion in the same manner as in the case he is restrained by a webbing secured to the vehicle body, thus enabling to improve the safety of the occupant.

Furthermore, when the rotatable plate 34 is turned about the pivot 32, the small pawl 52 is pushed up by the working arm 66 to be engaged with the small ratchet wheels 50, whereby the small ratchet wheels 50 are prevented from rotating in the windout direction of the webbing, so that a sliding resistance can be given against the webbing 22. Due to this sliding resistance, a tension being very much lower as compared with that at the occupant fastened portion acts on the webbing 22 clamped between the roller 42 and the lock bar 64, and consequently breakage of the webbing at the clamped portion can be avoided.

More specifically, as shown in FIG. 4, if the webbing tension at the occupant fastened side is $F_1$, the webbing tension at the side of the takeup shaft 20 is $F_2$, the contact angle is $\Theta$, and the coefficient of friction between the outer surface of the resin coating 48 and the webbing is $\mu$, then the following equation is established.

$$F_1 = F_2 \cdot e^{\mu \Theta} \tag{1}$$

Then, if $F_1 = 2000$ kg, $\mu = 0.2$ and $\Theta = 200°$, then the following equation may be obtained $$F_2 = \frac{F_1}{e^{\mu\theta}} = \frac{200 \text{kg}}{e^{0.2}\left(\frac{200}{180} \times 3.14\right)} = 1000 \text{kg} \tag{2}$$

From the foregoing, it is found that, if the roller 42 is stopped in rotation, then the webbing tension at the side of the takeup shaft is decreased to half. Consequently, breakage of the webbing 22 can be avoided.

There is a possibility that the small diameter portion of the rollers 42 will cause reaction forces of high value to the holders 38 when the webbing is clamped, so that the small diameter portions or the holders 38 may be deformed. When such a deformation occurs, the resin coating 48 provided on the outer periphery of the roller 42 comes into contact with the round holes 40, so that the roller 42 can be positively supported by the rotatable plate 34.

Furthermore, when the interval formed between the roller 42 and the lock bar 64 is progressively decreased toward the takeup shaft as shown in FIG. 4, an abrupt change in tension generated in the webbing can be prevented, which enables to avoid breakage of the webbing. Further, when the clamping force between the roller 42 and the lock bar 64 is locally increased, the resin coating 48 may be elastomerically deformed to absorb the local increase in the clamping force, which also contributes to avoid breakage of the webbing.

Figure 6:
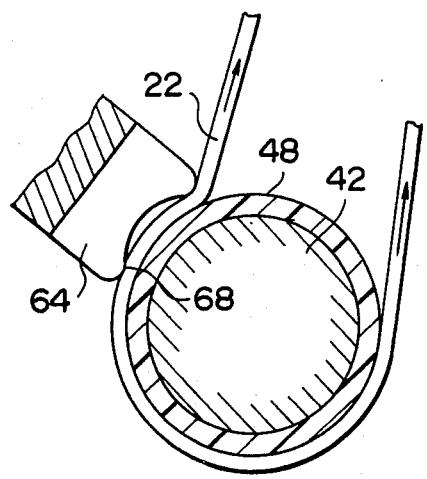
FIG. 6 is a sectional view showing a second embodiment of the present invention, which corresponds to FIG. 4.
Figure 7:
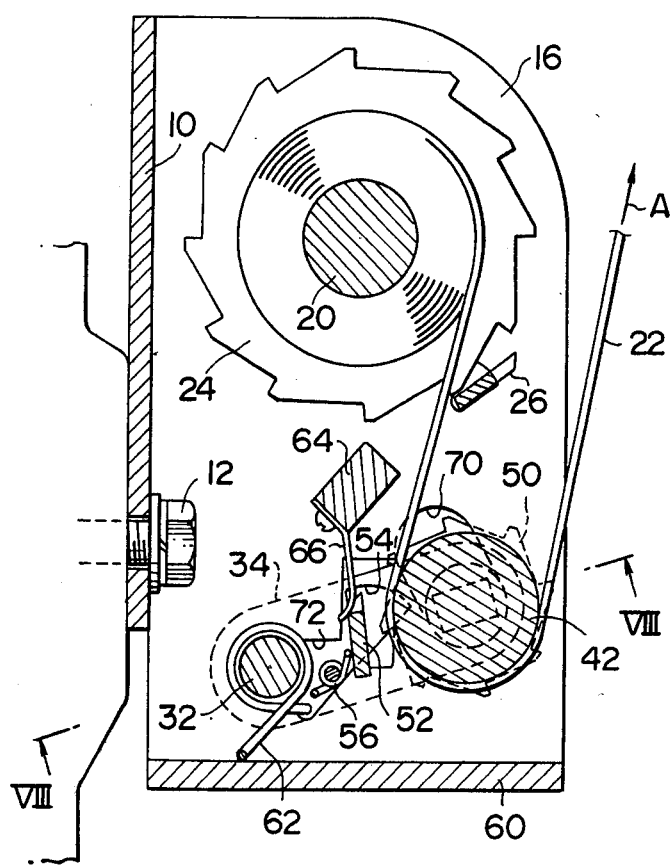
FIG. 7 is a sectional view showing a third embodiment.
Figure 8:
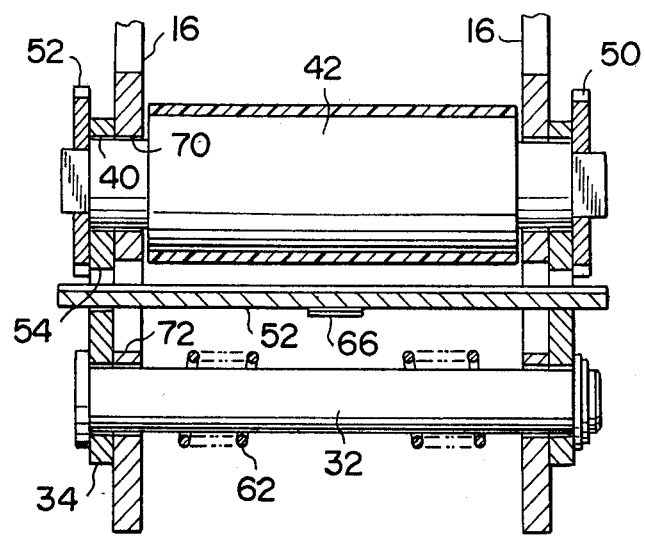
FIG. 8 is a sectional view taken along the line VIII—VIII in FIG. 7.
Figure 9:
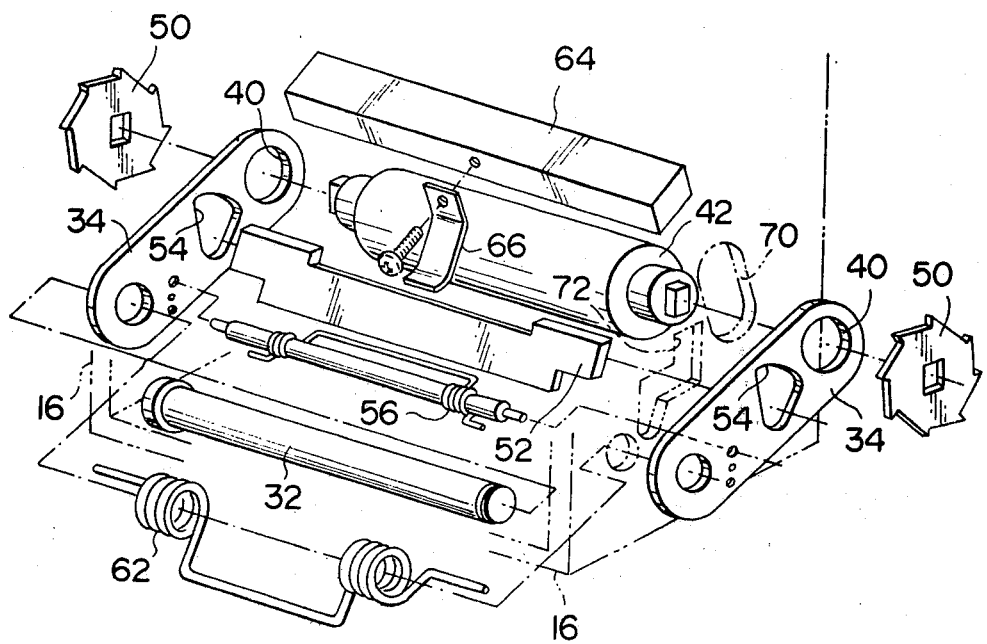
FIG. 9 is a disassembled perspective view of FIG. 7.

Next, FIG. 6 shows a second embodiment of the present invention, constructed such that the webbing is clamped at two positions of the lock bar 64 including one position close to the takeup shaft and the other position close to the occupant fastened portion of the webbing between the roller 42 and the lock bar 64, thus improving the clamping performance.

Additionally, in the abovedescribed embodiments, description has been given of those in which the roller is provided at the axially opposite end portions thereof with the small diameter portions 44. Needless to say, it should be possible that the small diameter portions 44 may have comparatively large diameters and directly, pivotally supported on the rotatable plate 34 as will be shown in a third embodiment that follows.

Next, FIGS. 7 through 10 show a third embodiment of the present invention.

Components and parts in this embodiment are substantially identical with those in the abovedescribed first embodiment. However, the pivot 32 penetrates through the legs 16 of the frame 10, and pivotally supports the rotatable plate 34 outwardly of this frame 10. Further, the roller 42 and the small pawl 52 also penetrate through slots 70 and 72 formed in the legs 16, respectively, and then, are rotatably supported at opposite end portions thereof by round holes 40 and windows 54, respectively. The other arrangement is similar to that of the abovedescribed first embodiment and performs functions similar thereto.

Figure 10:
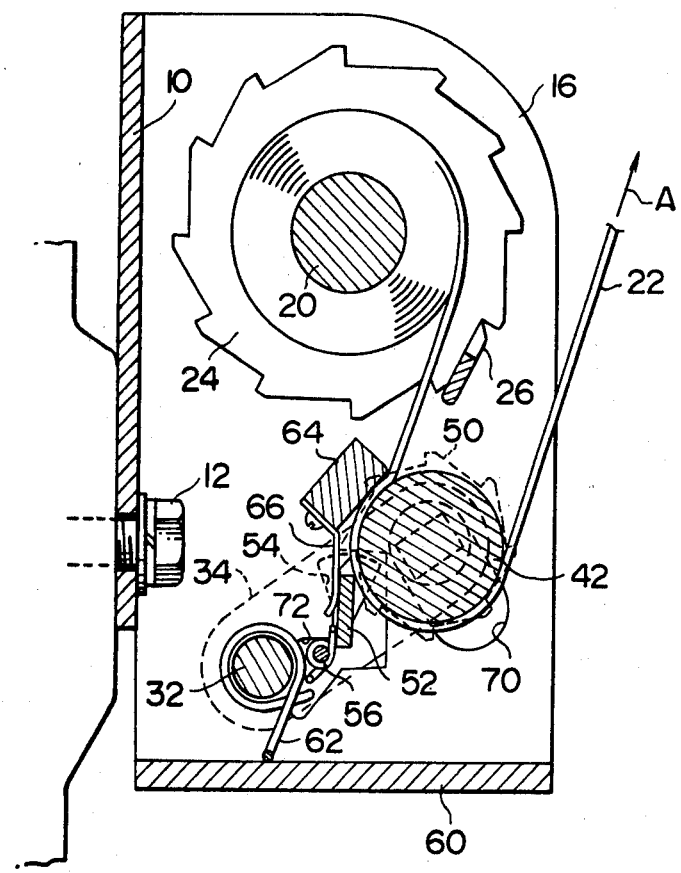
FIG. 10 is a view illustrating the webbing lock device of FIG. 7 in an actuated position.

Consequently, similarly to the abovedescribed embodiments, in this embodiment, during an emergency, as shown in FIG. 10, due to turning of the rotatable plate 34, the roller 42 clamps and locks the webbing 22 in cooperation with the lock bar 64, and the roller 42 is stopped in rotation by the engagement of the small pawl 52 with the small ratchet wheels 50, whereby the webbing 22 is decreased in tension, so that breakage of the clamped portion can be avoided.

Further, in this embodient, the rotatable plate 34 is provided outwardly of the legs 16, the dimensions between the pair of legs are decreased to diminish the frame 10 in size, and, when the webbing 22 tends to be shifted in the axial direction of the roller 42, the selvage portions of the webbing 22 are regulated by the inner surfaces of the legs 16, so that this shift can be prevented and the selvedge portions of the webbing 22 can avoid contacting the small pawl 52.

Figure 11:
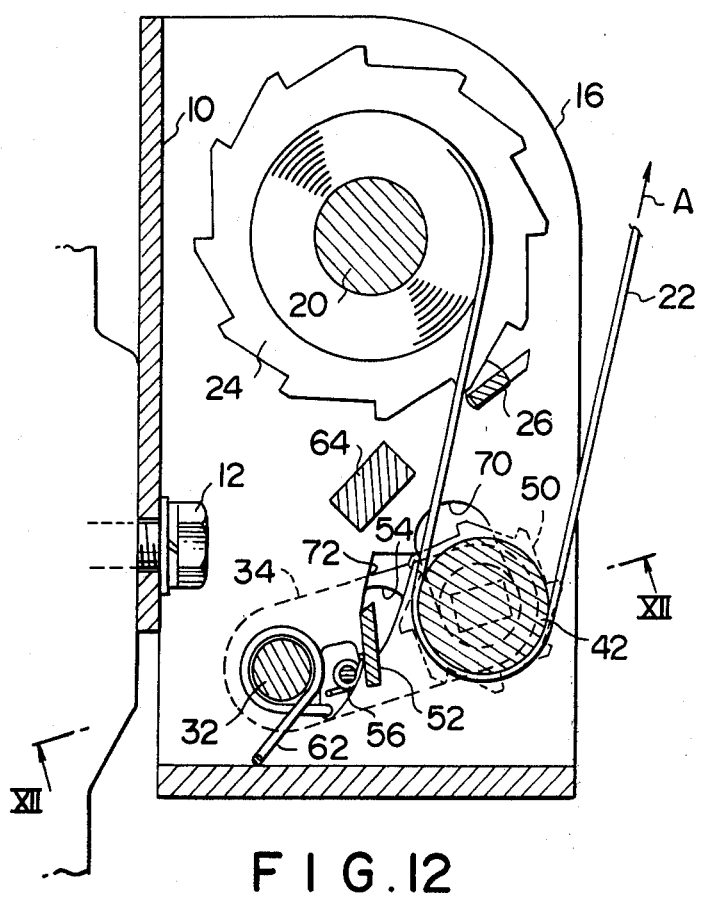
FIG. 11 is a sectional view showing a fourth embodiment.
Figure 12:
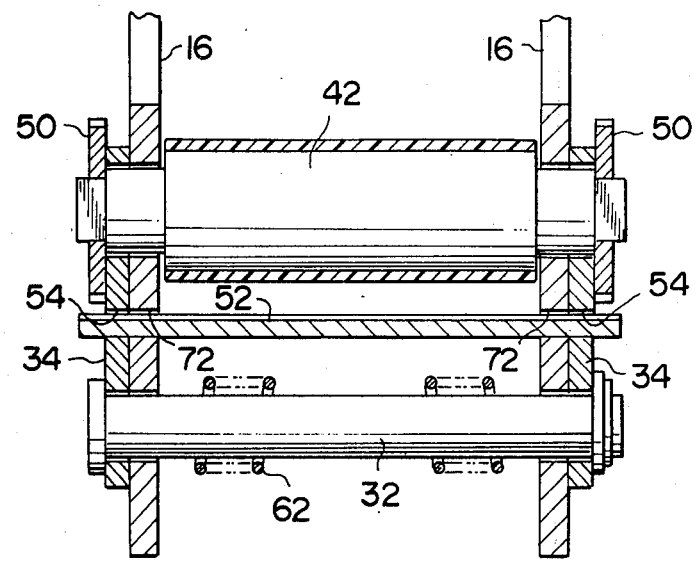
FIG. 12 is a sectional view taken along the line XII—XII in FIG. 11.

FIGS. 11 and 12 show a fourth embodiment of the present invention. In this embodiment, when the rotatable plate 34 is turned, the small pawl 52 is engaged with windows 72 formed in the legs 16 to be tilted, whereby the small pawl 52 is adapted to be brought into meshing engagement with the small ratchet wheels 50. With this arrangement, any defective meshing engagement can be avoided since, when the rotatable plate 34 is turned, the small pawl 52 is forcibly turned, whereby the small pawl 52 runs against the tooth top of the small ratchet wheel 50.

Additionally, in the abovedescribed embodiments, the webbing 22, which has been wound out of the takeup shaft 20, is turned back at the roller 42 and formed into substantially a letter 'U' shape, can have its intermediate portion be turned back at a single roller, whereby a resisting force against the webbing in the normal conditions of use is considerably low, and the webbing lock device can be rendered compact in size. Further, the diameter of the roller 42 can be made comparatively large, so that the resisting force against the webbing can be reduced as compared with the case the diameter of the roller is small.

As has been described hereinabove, the webbing locking device according to the present invention, wherein the roller of the rotatable plate is prevented from rotating by clamping means when the webbing is increased in tension, can offer outstanding advantages that, during normal running condition of the vehicle, the resisting force against the movement of the webbing in the longitudinal direction thereof is made low, and, during a vehicular emergency of the vehicle, the intermediate portion of the webbing is positively clamped so that the occupant restraining performance can be improved and an abrupt change in tension of the clamped portion of the webbing can be avoided.

What is claimed is:

1. A webbing locking device used in a seatbelt system for protecting an occupant during a vehicular emergency comprising:
    a frame secured to a vehicle body,
    a takeup shaft rotatably supported on said frame and biased to rotate in a direction winding said webbing therearound, said takeup shaft having first emergency lock means for stopping the rotation of said takeup shaft in an emergency, and thereby allowing the tension in said webbing adjacent to said takeup shaft to be increased due to an inertial force generated in the occupant,
    a rotatable plate pivotally supported on said frame,
    a roller rotatably supported on said plate and having the intermediate portion of the webbing guided therearound, whereby during stopping the rotation of said takeup shaft, a tensile force of the webbing pivots said rotatable plate through said roller, clamping means comprising a lock bar secured to said frame and adjacent to said roller for clamping the intermediate portion of the webbing between the circumference of said roller and said lock bar when said rotatable plate is pivoted, and second lock means for stopping the rotation of said roller with respect to said rotatable plate, including a working arm projected from said frame, small ratchet wheels solidly secured to the roller and a small pawl pivotally supported on the rotatable plate, said small pawl being adapted to engage said working arm so as to be rotated when the rotatable plate is turned to thereby engage the small ratchet wheels.

2. A webbing locking device as set forth in claim 1, wherein said clamping means is characterized in that the interval between the circumference of said roller and said lock bar is progressively decreased from the side of the occupant fastened portion of the webbing when the webbing is clamped.

3. A webbing locking device as set forth in claim 1, wherein said roller is pivotally supported on the rotatable plate through small diameter portions provided at axially opposite end portions thereof and capable of smoothly rotating during normal running condition of the vehicle.

4. A webbing locking device as set forth in claim 1, wherein said rotatable plate and said small ratchet wheels are provided outwardly of a pair of legs formed on said frame, whereby widthwise opposite end portions of the webbing guided around the roller are guided by the inner wall surfaces of said pair of legs.

5. A webbing locking device as set forth in claim 1, wherein said small pawl is inserted into windows formed in the frame and adapted to engage said windows, the small pawl adapted to be rotated when the rotatable plate is turned, to thereby engage the small ratchet wheels.

6. A webbing locking device for directly clamping the intermediate portion of an occupant restraining webbing to prevent the webbing from moving in the longitudinal direction thereof, so as to restrain an occupant, comprising:
 (a) a frame solidly secured to a vehicle body;
 (b) a pair of legs extended from opposite ends of said frame in parallel to each other;
 (c) a takeup shaft pivotally supported on said legs for winding up one end portion of the occupant restraining webbing by a baising force;
 (d) emergency lock means for stopping the rotation of said takeup shaft in an emergency, and thereby allowing the tension in said webbing adajcent to said takeup shaft to be increased due to an inertial force generated in the occupant;
 (e) a rotatable plate pivotally supported on said legs of the frame;
 (f) a roller pivotally supported on said rotatable plate and having the intermediate portion of the webbing guided therearound;
 (g) small ratchet wheels solidly secured to said roller;
 (h) a small pawl pivotally supported on said rotatable plate and opposed to said small ratchet wheels;
 (i) working means adapted to engage the small pawl with the small ratchet wheels, the working means being actuated by the rotatable plate being rotated under the tension of the webbing, to stop the small ratchet wheels and the roller from rotating with respect to said rotatable plate, whereby the webbing guided around is subjected to a resistance; and
 (j) a lock bar secured to said frame and adapted to clamp the intermediate portion of the webbing in cooperation with said roller, when the rotatable plate is turned, to clampingly hold a section of webbing between the roller and the takeup shaft, to thereby prevent the webbing from moving in the longitudinal direction thereof.

* * * * *